Patented Jan. 6, 1948

2,434,148

UNITED STATES PATENT OFFICE 2,434,148

OPTICAL GLASS

Paul F. De Paolis, Rochester, N. Y., assignor to Eastman Kodak Company, Rochester, N. Y., a corporation of New Jersey No Drawing. Application August 4, 1945, Serial No. 609,024

5 Claims. (Cl. 106—47)

This application relates to glass having optical values in a range that is useful in the designing of optical instruments. Specifically, this application relates to such glass having an index of refraction for the D line ($n_D$) between 1.75 and 1.80 and an Abbe value ($\nu$) in the region between 37 and 40.

In general these glasses are of the non-silicate type, having boric oxide as the glassifier and are of the type generically covered by Reissue Patent No. 21,175, Morey, over which they are specific improvements.

While the Morey patent disclosed the wide field within which useful glasses might be found, this field is not of uniform productiveness. The various oxides cannot be combined in all proportions to obtain equally useful glasses; nor are they all compatible in all proportions to make a glass without tendency to crystallize or devitrify. This application relates to a particular area of that field that has been found to have definite utility in the designing of lenses and optical instruments.

The glasses herein described are characterized, in addition to the optical values mentioned, by the presence of lanthanum, titanium, and thorium oxides in substantial amounts, over ten per cent of each, totaling about fifty per cent of the batch, the remainder of the batch consisting principally of the oxides of the divalent metals. In the first example molybdenum may be substituted in whole or in part for titanium, and beryllium for aluminum, and in the second example a small amount of tungsten oxide is added.

I have found that the ingredients mentioned, in substantially the proportions given, will with ordinary glass-making technique make a uniform glass of high transparency, hardness, stability, and weather resistance, capable of taking a high optical polish and of withstanding normal glass-treating processes. They have desirable characteristics within the limits mentioned, the refractive and dispersive indices varying somewhat when the proposed variations in ingredients are used.

The following specific examples are given, the first of which includes a greater number of ingredients. The oxides of the elements mentioned are used in the proportions by weight as given.

|  | Example 1 | Example 2 |
|---|---|---|
| Lanthanum oxide | 25.0 | 20 |
| Titanium oxide | 12.5 | 15 |
| Thorium oxide | 12.5 | 15 |
| Tungsten oxide |  | 5 |
| Barium oxide | 15.0 |  |
| Strontium oxide | 5.0 |  |
| Calcium oxide | 4.0 |  |
| Cadmium oxide | 2.0 | 15 |
| Aluminum oxide | 1.0 | 2 |
| Boric oxide | 22.0 | 28 |
| $n_D$ | 1.775 | 1.75 |
| $\nu$ | 37.5 | 40.0 |

It is to be understood that, as is usual in glass making, the ingredients may not be incorporated originally in the form of oxides, but as other compounds which are reduced to oxides in the furnace.

In the examples given, although the parts are precisely given, and these are preferred, it is to be understood that variations in these proportions and addition of other oxides in small quantities are contemplated, provided these changes are within the ranges and the resulting proportions are of the order of those given in the claims. Such changes will naturally result in variations in the optical properties. All such modifications and equivalents I consider as within the scope of my invention.

Having thus described my invention, what I claim is:

1. An optical glass comprising the oxides of lanthanum, from 18 to 27 parts by weight; the oxides of titanium and molybdenum totaling 12 to 18 parts; oxide of thorium, 12 to 18 parts; oxides selected from the group consisting of the oxides of barium, strontium, calcium, and cadmium totaling 15 to 27 parts; boron, 20 to 30 parts; and aluminum and beryllium, less than 3 parts the whole amounting to 100 parts.

2. An optical glass having a refractive index for the D line of the order of 1.775 and a dispersive index of the order of 37.5 and comprising the following oxides in proportions of the order indicated: lanthanum, 25 parts; titanium and molybdenum totaling 12.5 parts; thorium, 12.5 parts; barium, strontium, calcium, and cadmium, totaling 26 parts; oxides of aluminum and beryllium totaling 2 parts; boron, 22 parts the whole amounting to 100 parts.

3. An optical glass having an index of refraction for the D line of the order of 1.75 and a dispersive index of the order of 40 and comprising the oxides of the following elements in proportions by weight of the order indicated: lanthanum, 20 parts; titanium, 15 parts; tungsten, 5 parts; thorium, 15 parts; cadmium, 15 parts; aluminum, 2 parts; boron, 28 parts the whole amounting to 100 parts.

4. A borate optical glass composition including by weight: boron oxide, 20 to 30 per cent; lanthanum oxide, 18 to 27 per cent; thorium oxide, 12 to 18 per cent; cadmium oxide, 2 to 15 per cent; titanium oxide 12 to 18 per cent; aluminum oxide, less than 3 per cent.

5. A borate optical glass composition including by weight: boron oxide, 20 to 30 per cent; lanthanum oxide, 18 to 27 per cent; thorium oxide, 12 to 18 per cent; cadmium oxide, 2 to 15 per cent; titanium and molybdenum oxide, totaling 12 to 18 per cent; aluminum and beryllium oxide, totaling less than 3 per cent.

PAUL F. DE PAOLIS.